United States Patent
Vogel

(10) Patent No.: US 6,823,986 B2
(45) Date of Patent: Nov. 30, 2004

(54) DEVICE AND METHOD FOR CONVEYING WORK PIECES

(75) Inventor: Norbert Vogel, Bubenreuth (DE)

(73) Assignee: Schuler Automation GmbH & Co. KG, Hesssdorf (DE)

( * ) Notice: Subject to any disclaimer, the term of this patent is extended or adjusted under 35 U.S.C. 154(b) by 0 days.

(21) Appl. No.: 10/470,821

(22) PCT Filed: Jan. 29, 2002

(86) PCT No.: PCT/DE02/00304
§ 371 (c)(1),
(2), (4) Date: Jul. 30, 2003

(87) PCT Pub. No.: WO02/060788
PCT Pub. Date: Aug. 8, 2002

(65) Prior Publication Data
US 2004/0060801 A1 Apr. 1, 2004

(30) Foreign Application Priority Data
Jan. 31, 2001 (DE) .......................... 101 04 510

(51) Int. Cl.$^7$ ............................. B65G 21/20; B65G 47/91
(52) U.S. Cl. ................................ 198/689.1; 198/690.1; 198/688.1
(58) Field of Search ........................... 198/689.1, 688.1, 198/690.1

(56) References Cited

U.S. PATENT DOCUMENTS

| | | | | |
|---|---|---|---|---|
| 3,182,998 A | * | 5/1965 | Peterson ...................... 271/197 |
| 3,628,654 A | * | 12/1971 | Haracz ...................... 198/689.1 |
| 3,708,058 A | * | 1/1973 | Kalven ...................... 198/689.1 |
| 3,827,548 A | * | 8/1974 | Matsuo ...................... 198/689.1 |
| 4,735,449 A | | 4/1988 | Kuma | |
| 4,804,081 A | * | 2/1989 | Lenhardt ...................... 198/689.1 |
| 5,695,043 A | * | 12/1997 | Maezuru et al. ......... 198/689.1 |
| 5,857,605 A | | 1/1999 | Welch et al. | |
| 5,878,868 A | * | 3/1999 | Gotoh et al. ............. 198/689.1 |
| 6,102,191 A | * | 8/2000 | Janzen et al. ............ 198/689.1 |
| 6,422,377 B1 | * | 7/2002 | Ulrich ...................... 198/696.1 |
| 6,510,940 B1 | * | 1/2003 | Micciche et al. ......... 198/689.1 |

FOREIGN PATENT DOCUMENTS

DE      299 20 893 U      3/2000

* cited by examiner

Primary Examiner—Douglas Hess
(74) Attorney, Agent, or Firm—Rankin, Hill, Porter & Clark LLP

(57) ABSTRACT

The invention relates to a device for conveying work pieces, especially suspended plate-shaped work pieces such as metal sheets or plates. The device includes at least one driven belt (1) that revolves around a retaining device (3) and that conveys work pieces (W) adhering thereto. A controllable device (6) for generating a negative pressure is provided on the belt (1) for the purpose of retaining the work pieces on the belt (1). An opening plane (22) defined by suction ports (7) of the control device is recessed in relation to a plane of conveyance (F) defined by the exterior of the belt (1) towards the retaining device (3) by a distance (A) so that a gap (Z) is formed between a work piece (W) adhering to the belt (1) and the opening plane (22) and the work piece (W) is retained on the belt (1) by the negative pressure produced in the gap (Z). In order for the work pieces (W) to be always retained with the same force independent of their size, a device (8, 23, 25, 26, 29, 30, 32) for venting the gap (Z) so that the work piece is retained on the belt (1) by a dynamic negative pressure.

27 Claims, 11 Drawing Sheets

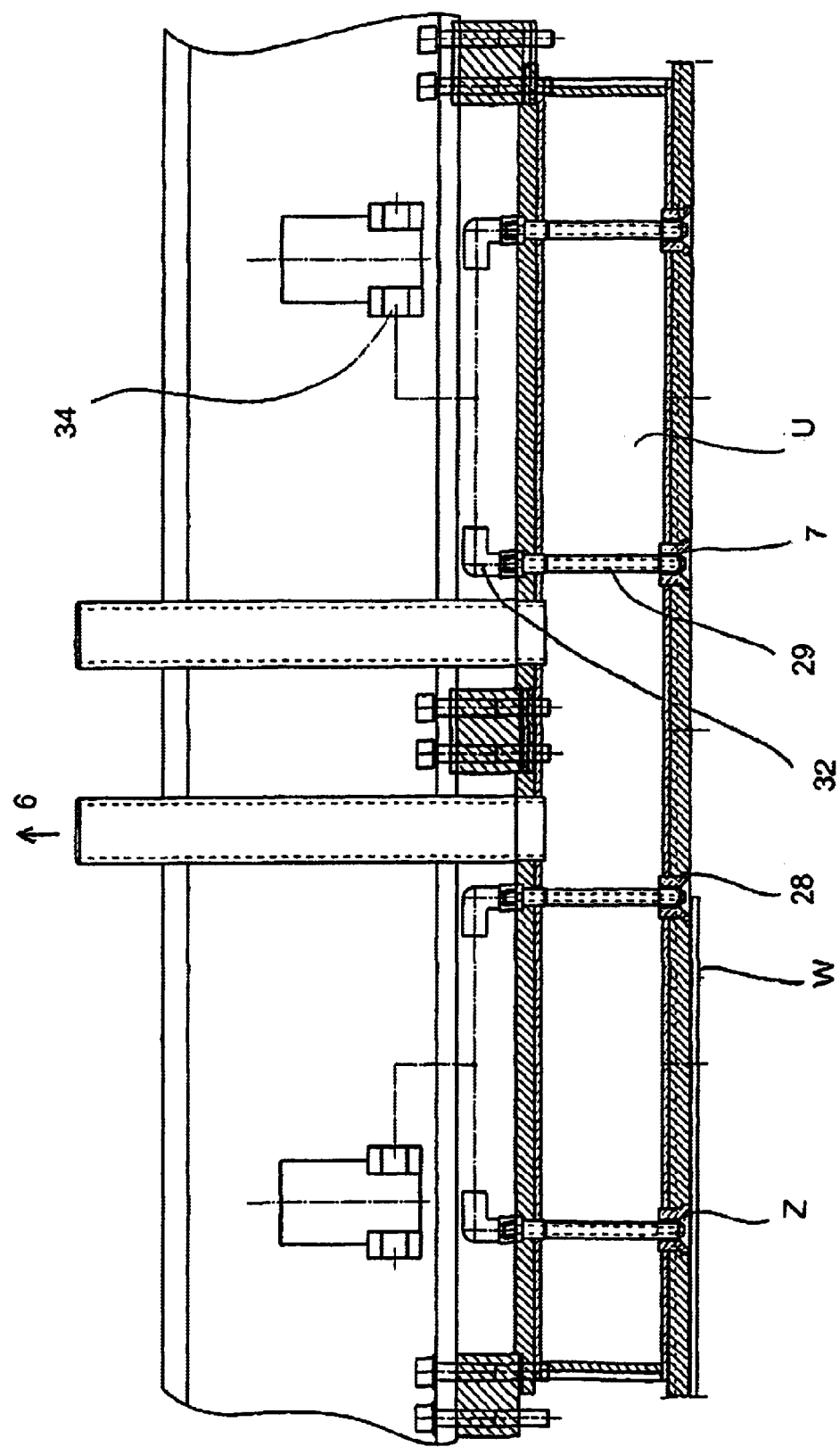

DEVICE AND METHOD FOR CONVEYING WORK PIECES

Said device and said method are known from DE 299 20 893 U1, for instance. With the known device, each suction port is allocated to a special negative pressure generation device. To control the negative pressure, the negative pressure generators can be turned on and off individually or in groups. In particular to eject the work pieces adhering to the conveyor belt, the negative pressure generator devices are switched off in the ejection area. The suction jets are positioned here at a short interval to the conveying side of the work piece. The distance between the conveying side of the work pieces and the suction jets is so small that only a small amount of false air is suctioned through the opening slits remaining on the two edges of the work piece. It forms a pseudo stationary negative pressure.

The layout of the known device is relatively complicated. A large number of negative pressure generator devices must be provided. This requires a relatively large amount of space. The design of the known device is not particularly compact. Due to the creation of stationary negative pressure, large work pieces require greater force per area unit to be drawn to the conveyor belt than smaller work pieces. Depending on the size of the particular work piece, the speed of the drive motor must be varied so that the conveying speed can be held constant. The generation of static negative pressure also drops more slowly, when shut off, for large work pieces than for small work pieces. Depending on the size and weight of the adhering work pieces, dropping off takes place after the expiration of varying periods of time after the negative pressure generator devices have been switched off. Planned and precise ejection of work pieces is not possible with the known device.

From U.S. Pat. No. 4,804,081 a device for suspended conveyance of work pieces is known. Also in this device, the suction jets are placed between two parallel conveyor belts. They are staggered at a short distance opposite a conveying side of the work pieces so that a small gap is created between the conveyor side of the work piece and the opening edge of the suction jet. To prevent the penetration of false air into the gap, cross bars are provided which subdivide the suction area between the conveyor belts into rectangular suction zones. When the work pieces are conveyed, stationary negative pressure is also created here which leads to the aforementioned disadvantages.

The object of the invention is to remove the disadvantages in accordance with the state of art. In particular it should be provided a device for suspended conveyance of non-magnetic work pieces which is easy and inexpensive to construct. An additional goal of the invention is to show a device and a method with which it is possible to precisely drop off work pieces of varying sizes and varying weights.

According to the device side invention, there is provided a means to ventilate the gap so that the work piece is held on the conveyor belt by a dynamic negative pressure which is created.

The term dynamic negative pressure means negative pressure which is created in accordance with the Venturi principle as the result of a current. The current flows from the ventilating device to the suction ports. The prerequisite for creation of dynamic negative pressure is that a sufficiently high volume current per time unit flows through the ventilating device to the gap and is suctioned off again through the suction ports. A sufficiently high current speed for the creation of negative pressure is then generated in the gap. The amount of negative pressure is calculated from the Bernoulli equation. Typical current speeds here are between 60 and 80 m/sec. The formation of dynamic negative pressure provided by the invention offers the advantage that, regardless of their size, work pieces can always be held on the conveyor belt with the same specific force per area unit. Precise dropping off is possible regardless of the size of the work piece. The work pieces can always be conveyed at the same speed without regulation of the power of a drive unit.

In optimised arrangement the suction ports on a wall pointing towards the work pieces of a negative pressure passageway running essentially parallel to the direction of conveyance of the work pieces.

Provision of a common negative pressure passageway makes it unnecessary to provide each of the suction ports with a special negative pressure generation device. The device can be operated with a single negative pressure generation device which is connected to the negative pressure passageway. It can be compact. Provision of a common negative pressure passageway also creates free constructive space which can be used for systems for precise dropping off of the work pieces.

In optimised arrangement the suction ports are created by suction jets in the wall. This makes it possible to equip the device with suction ports of a suitable suction cross section to meet the requirements.

In optimised arrangement the device is equipped with ventilating openings at regular intervals for ventilating on the side of the holding device pointing toward the work pieces so that a essentially uniform, dynamic negative pressure is created over the entire length of the gap. To ventilate the gap it is also possible, however, to provide grooves in the conveyor belt crosswise to the direction of conveyance, for example. In some cases the device for ventilating can also be provided from the work piece side, particularly when the work piece has breakthroughs of suitable size or a suitably irregular surface, for instance. The device for ventilating ensures that work pieces can always be held on the conveyor belt with the same force regardless of their size. The ventilating openings can be located on the wall of the negative pressure passageway pointing towards the work pieces. Each of the ventilating openings forms the end of a ventilating line reaching through the negative pressure passageway which can be connected with a ventilating passageway. The ventilating passageway may be connected for ventilating with the environment but it can also be pressurised with slight overpressure.

A device for control and/or regulation of the dynamic negative pressure is provided. This can be a device for control and/or regulation of a negative pressure source providing the negative pressure passageway with negative pressure. For instance, the device can be used to change the speed of a vacuum source used as negative pressure source. However, a means of controlling the amount of air passing through the ventilating passageway can also be provided. This makes the device particularly universal. For example, it can be easily adjusted to the particular requirements by setting an air shutter. Usually the negative pressure passageway is always under a specified negative pressure which is dimensioned so that the required current flow speed can be generated quickly in the gap when a work piece is placed on the conveyor belt.

Particularly for precise dropping off of the work pieces, a device can be provided for generation of a burst of compressed air interrupting the dynamic negative pressure when desired. The device for generation of a burst of compressed air can be provided along a specified area of the retaining device. The specified area may be a dropping off zone of the work pieces. The compressed air burst is directed from the negative pressure passageway through the suction ports to the gap. This permits a compact construction. The dynamic negative pressure can not only be interrupted by the dropping off of work pieces but also by blowing additional air into the specified area of the gap which achieves fast ejection of the work pieces. If air continues to be suctioned through the suction ports while the compressed air burst is being generated in the specified area, the amount of air added with the compressed air burst per time unit must be greater than the amount of air suctioned off through the suction ports.

In constructive design the device is equipped with compressed air jets arranged coaxially to the suction ports. The compressed air jets can be moved back and forth axially against the suction ports. A particularly advantageous design characteristic is that the suction ports can be closed with the compressed air jets. When closed, no more air can be suctioned from the gap in the negative pressure passageway through the suction ports.

With respect to construction it has been shown useful to position the compressed air jets in the negative pressure passageway. This permits a particularly compact design of the device.

To drop off the work piece it is also possible to close the suction ports. In this case a pistons which can be adjusted via compressed air can be used instead of the compressed air jets and which can close the suction ports when desired.

Another development is that a ventilating opening and, if necessary, a compressed air jet is allocated to each suction port. Naturally it is also possible that a different ratio of the number of suction ports to the number of ventilating openings and, if necessary, the compressed air jets can be chosen. The suction ports and the ventilating openings can be alternately arranged consecutively along the length of the retaining device. The aforementioned characteristics simplify the construction. This makes it inexpensive to manufacture the device.

The compressed air jets can be pressurised with compressed air to drop off the work pieces. Naturally it is possible to activate the compressed air jets in groups for precise dropping off of a work piece or to pressurise them with compressed air. A control device in accordance with the state of technology can be used for this.

It is considered particularly advantageous that the retaining device contains magnets (preferably electrically controllable) so that adherence of magnetic work pieces to the conveyor belt is controlled by a magnetic field. An additional advantageous constructive development is the placement of the negative pressure passageway between the magnets. Such a device is particularly universal. Not only can non-magnetic work pieces be conveyed and precisely dropped off but also magnetic work pieces.

The inventive device is further characterised by a procedure for suspended conveyance of work pieces, in particular plate-shaped work pieces such as metal sheets or plates so that a device is provided for ventilating the gap so that the work piece is retained on the conveyor belt by dynamic negative pressure created in the gap. By applying a dynamic negative pressure as used by the invention, expensive sealing measures familiar in state-of-technology construction can be omitted when stationary negative pressure is used.

An advantageous construction development is that the device is equipped at regular intervals with ventilating openings along the retaining device for ventilating so that a primarily uniform, dynamic negative pressure is available over the entire length of the gap. This ensures that the work pieces are always drawn to the conveyor belt with the same force at all points along the gap.

It is useful to interrupt the dynamic negative pressure with a burst of compressed air directed toward the gap to drop off the work pieces. The suggested procedure causes a sudden breakdown of the dynamic negative pressure. Work pieces adhering to the conveyor belt can thus be precisely dropped off. The compressed air burst can be directed from a negative pressure passageway through the suction ports to the gap. Provision of such a negative pressure passageway also contributes to the compact and simple construction of the device for performance of the procedure.

In addition, the dynamic negative pressure can be controlled and/or regulated with a device for ventilating the gap. To set a specified dynamic negative pressure, a specified amount of air can be fed to the gap. The device for ventilating can be equipped with ventilating openings on the wall of the negative pressure passageway pointing towards the work pieces. Each ventilating opening can be the end of a ventilating line covering the negative pressure passageway. The ventilating openings can be connected with a ventilating passageway. The dynamic negative pressure can be adjusted with a device for control and/or regulation. This can be a device with which the ventilating of the gap is controlled and/or regulated.

It is advantageous that the compressed air jets move axially in the direction of the suction ports when pressurised with compressed air. The suction ports can be closed preferably with the compressed air jets when the compressed air jets are pressurised with compressed air. The aforementioned procedural steps contribute to the particularly quick and efficient dispersion of the dynamic negative pressure.

The burst of compressed air is preferably generated in a specified group of consecutive suction ports. This makes it possible to precisely drop off particularly large plate-shaped work pieces. In addition, at least one additional suction port upstream of the group of suction ports can be closed to drop off the work piece. The suction port can be closed, for example, with a piston which can be pressurised with compressed air. This measure contributes to the avoidance of the occurrence of an undesired dynamic negative pressure around the edges of the dropping off zone.

The invention will now be described in more detail using an example based on the drawing.

Figure 3:
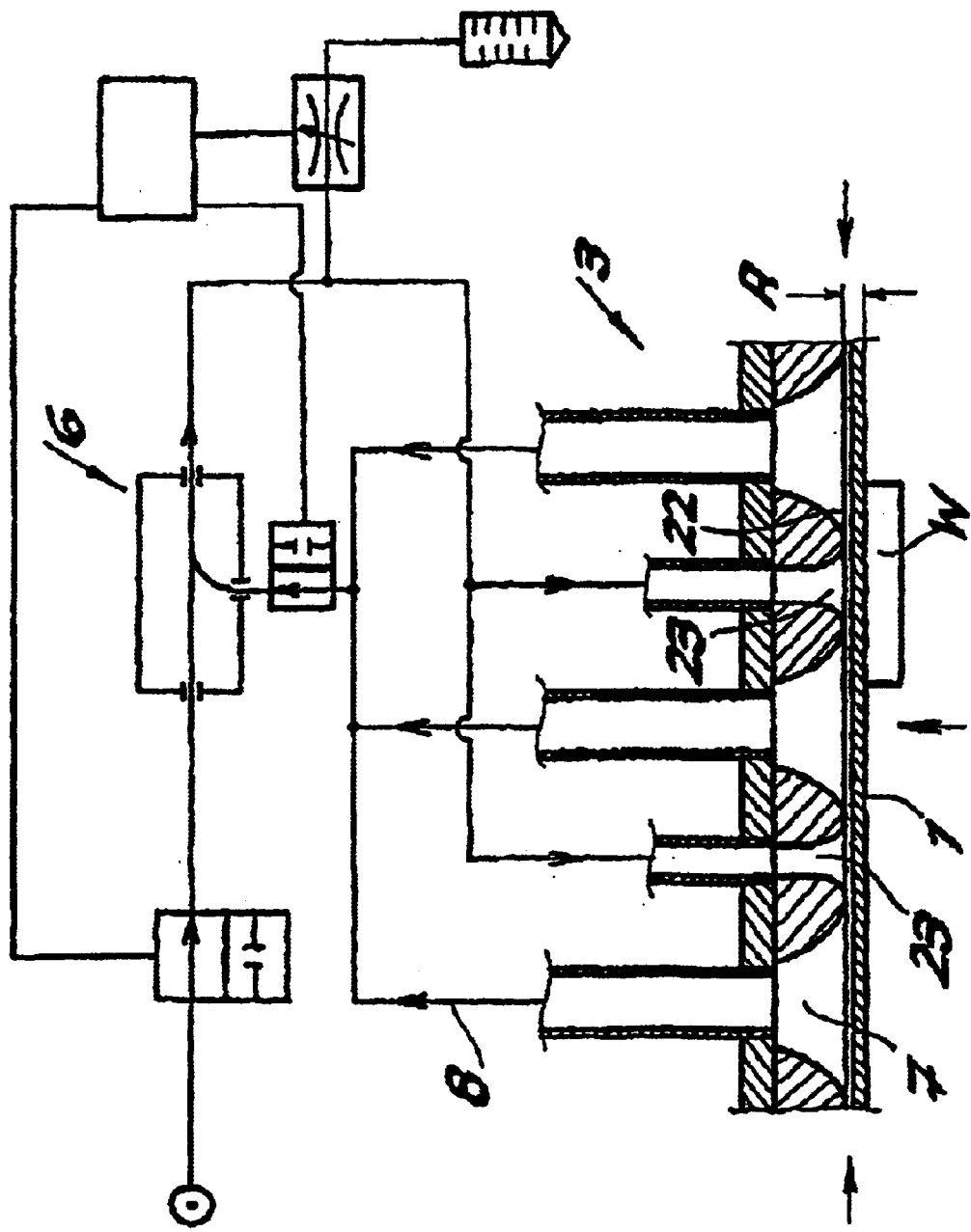
Figure 4:
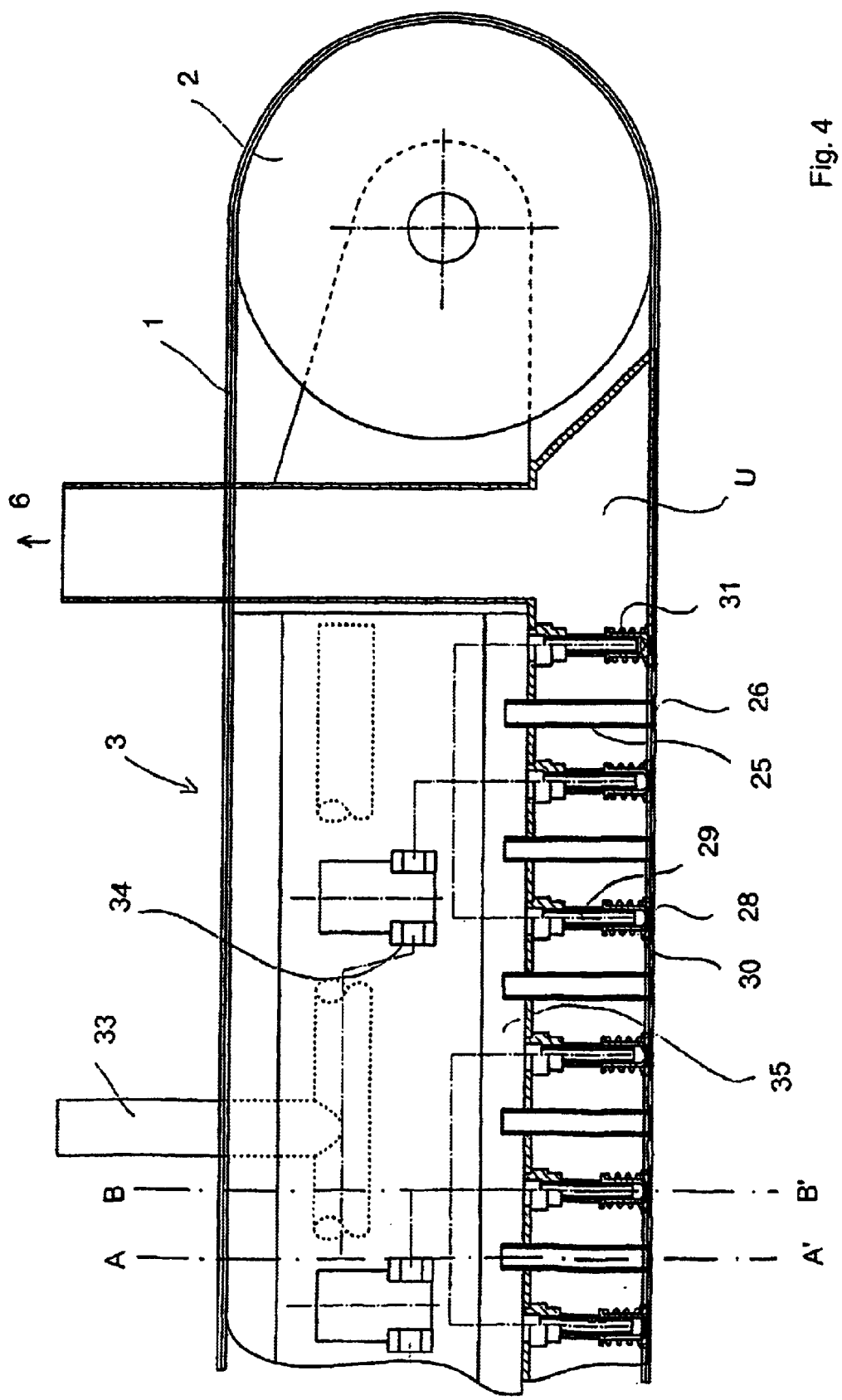
Figure 5:
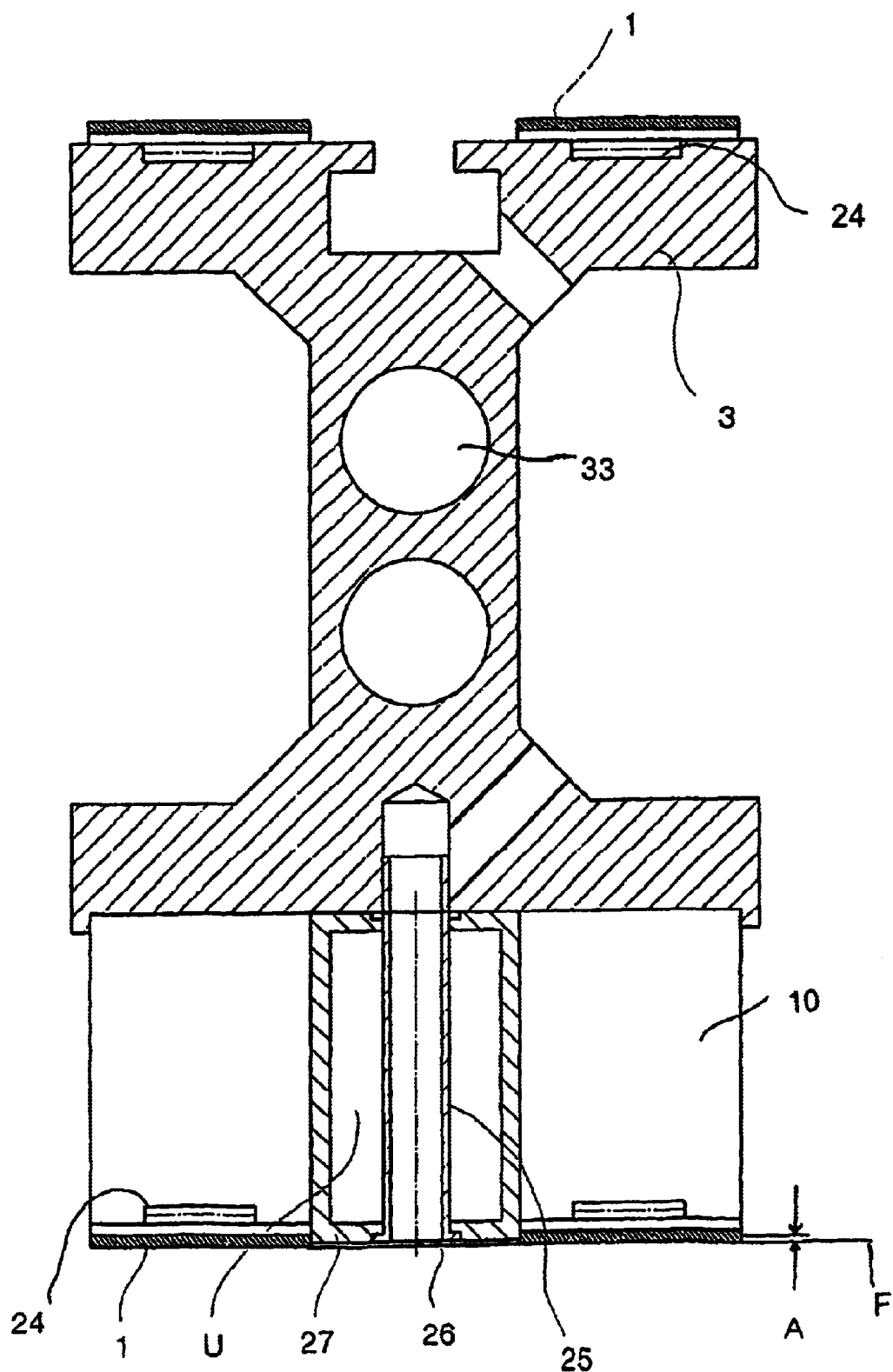
Figure 6:
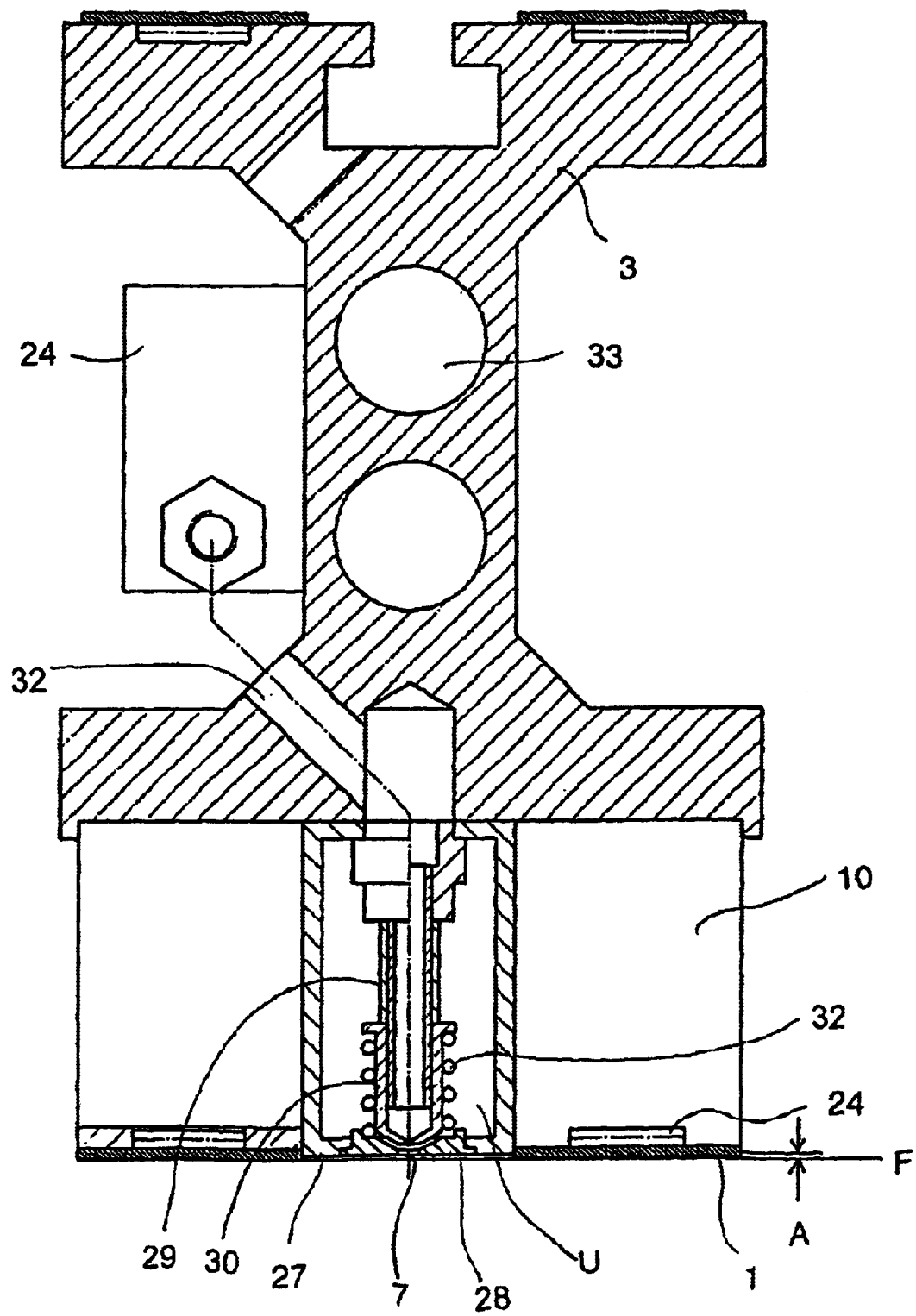
Figure 7:
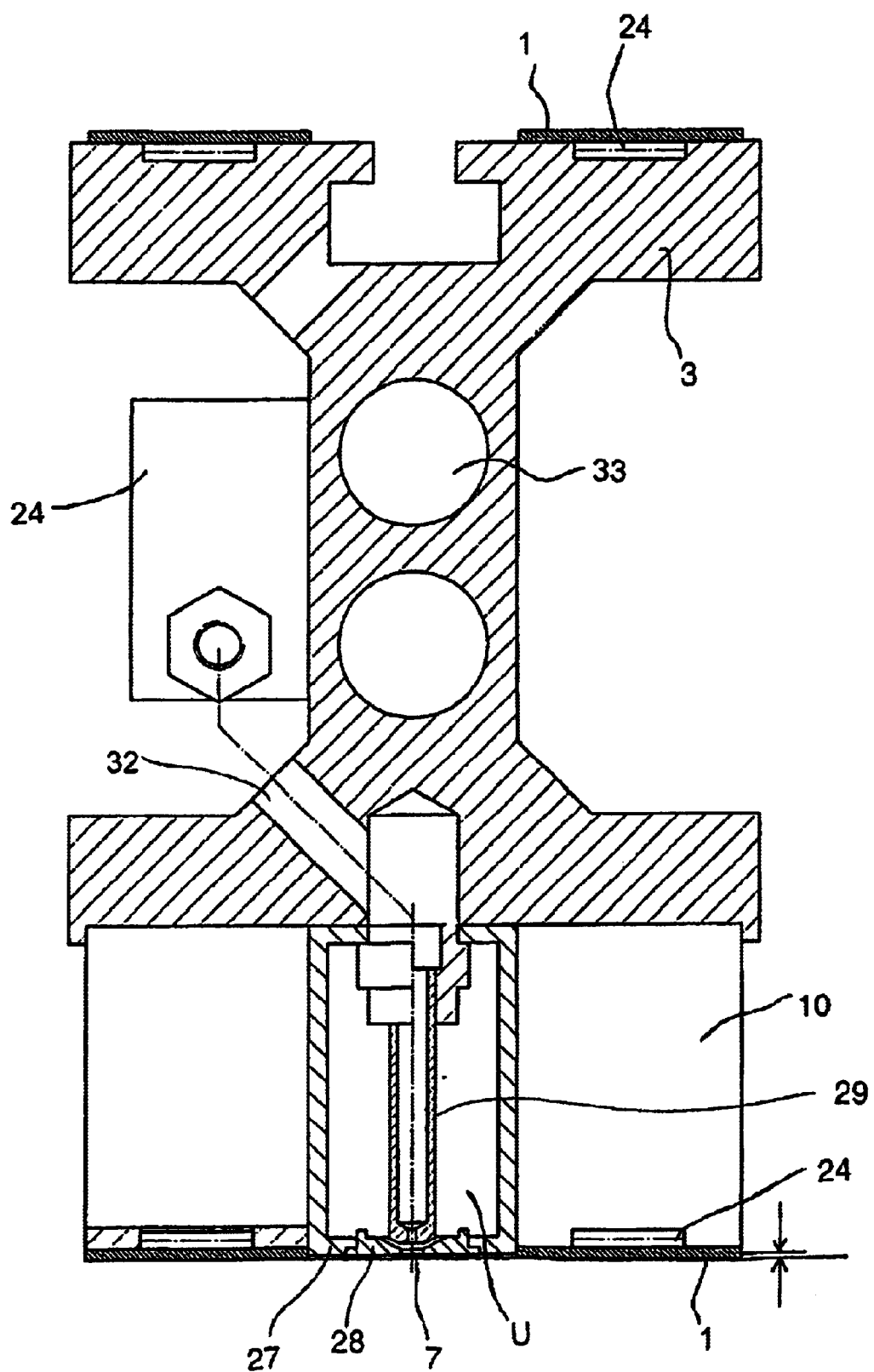
Figure 8:
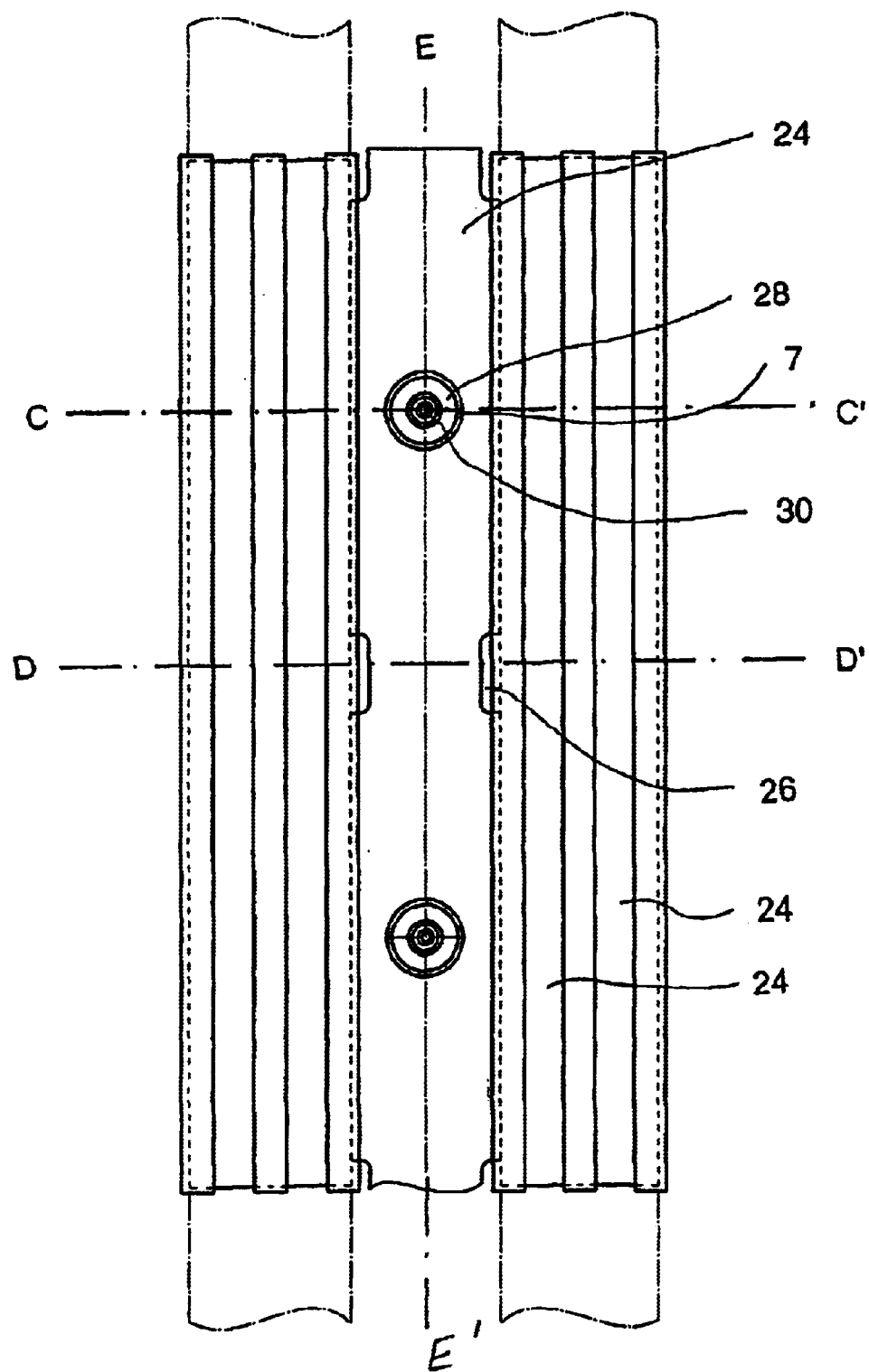
Figure 9:
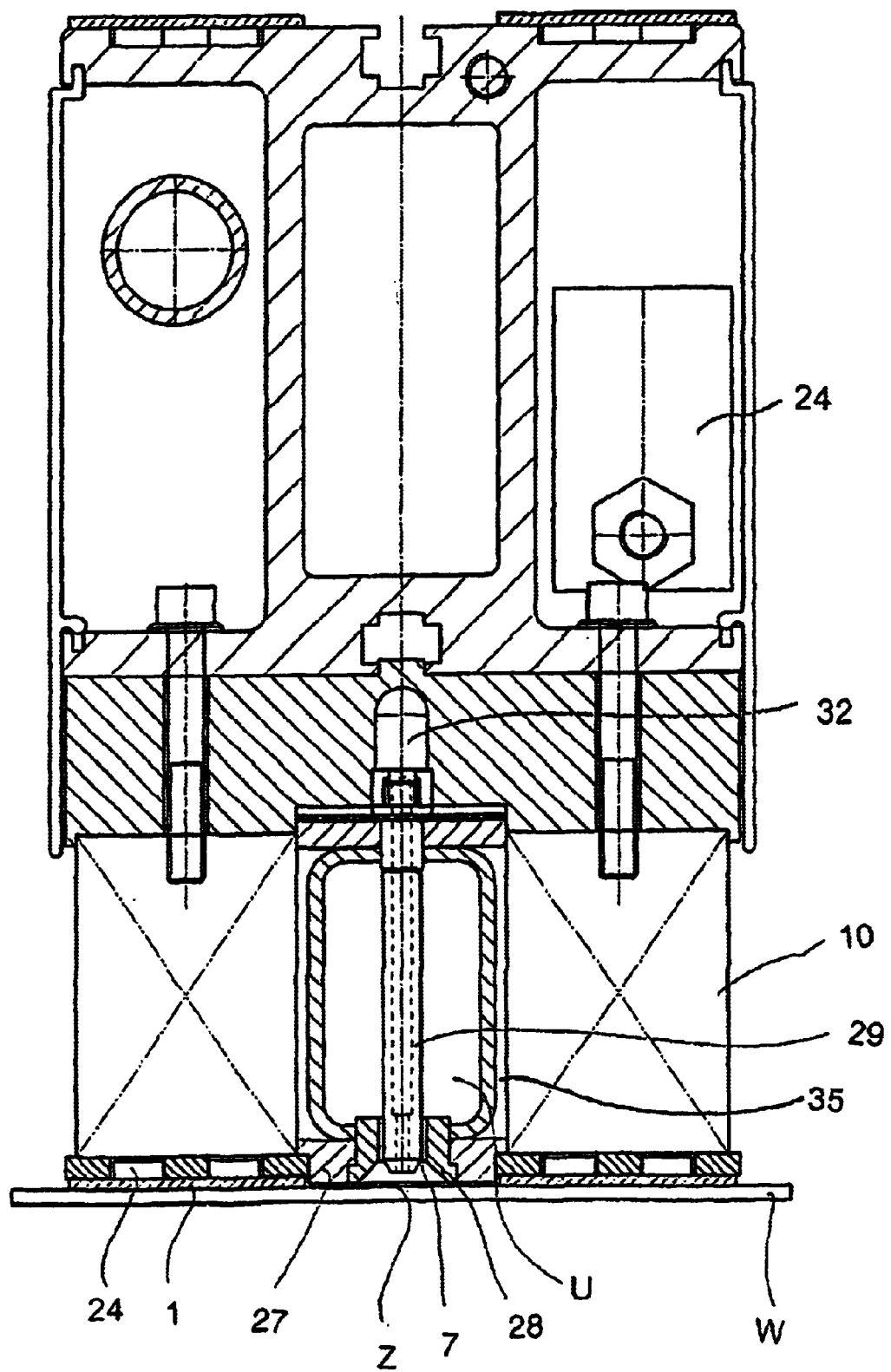
Figure 10:
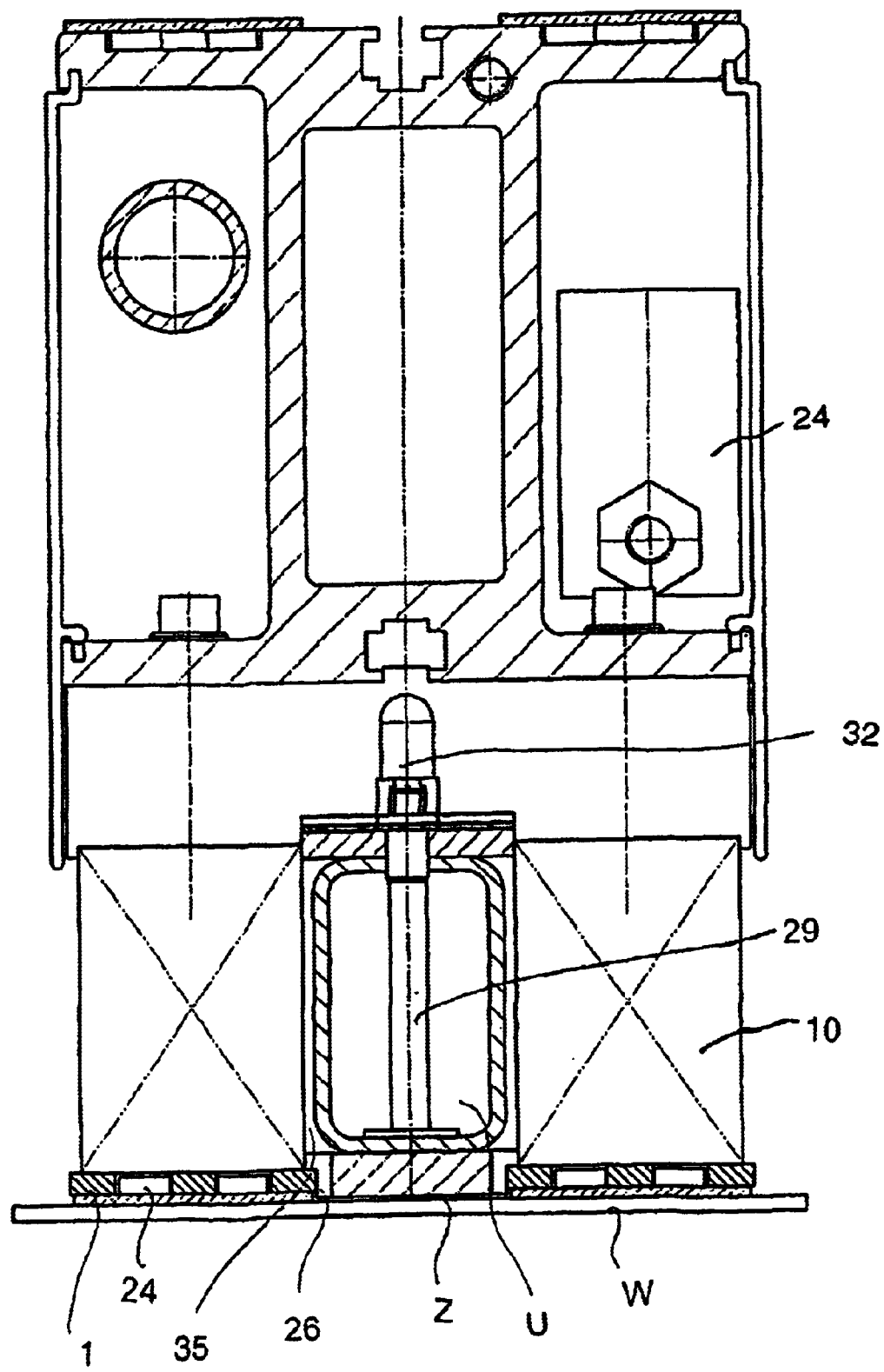

FIG. 3 shows another version of the first device with additional blow-out openings, FIG. 4 shows a diagram of the longitudinal section through a second device, FIG. 5 shows a cross section along the intersection line A-A' in accordance with FIG. 4, FIG. 6 shows a cross section in accordance with intersection line B-B' in accordance with FIG. 4, FIG. 7 shows a cross section view in accordance with a version of the second device, FIG. 8 shows a top view of the bottom of a third device, FIG. 9 shows a cross section view in accordance with intersection line C-C' in FIG. 8, FIG. 10 shows a cross section view in accordance with intersection line D-D' in FIG. 8, FIG. 11 shows a side section view in accordance with FIG. 9.

Figure 1:
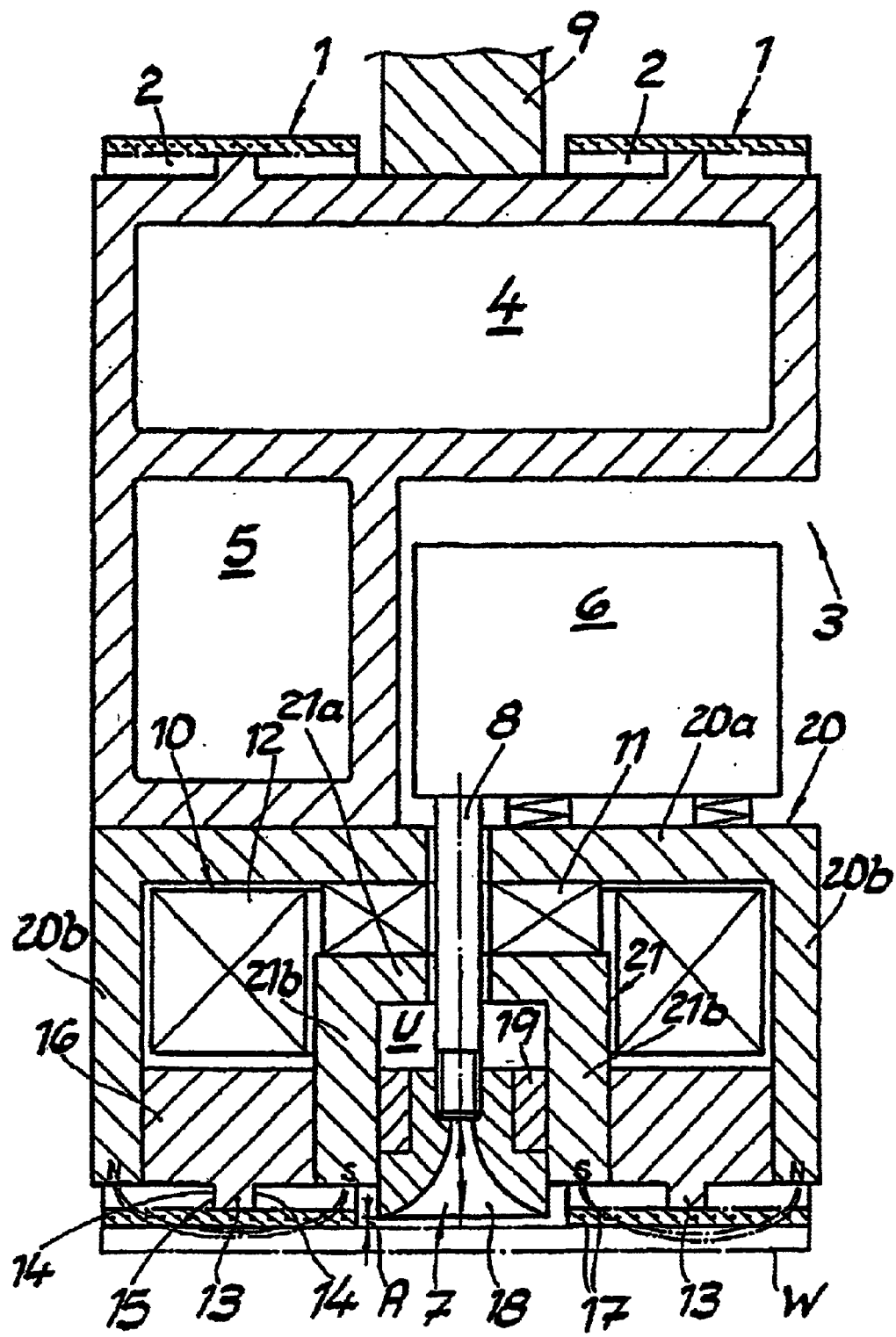
FIG. 1 shows a cross section through a first device.
Figure 2:
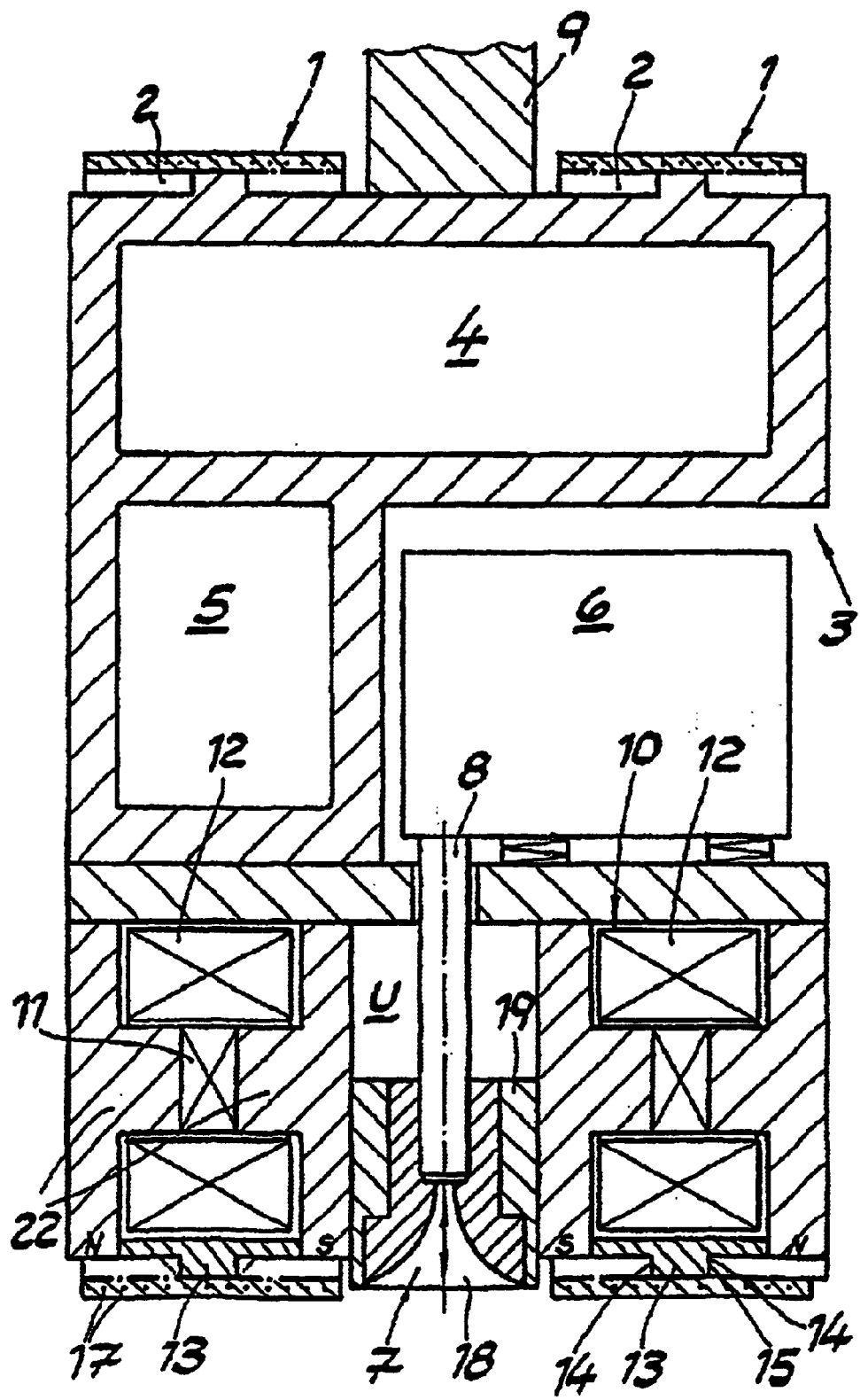
FIG. 2 shows a modified version of the first device shown in FIG. 1.

FIGS. 1 to 3 show a first device for conveyance of the work pieces W which involve suspended, plate-shaped sheets or plates. These sheets or plates can be manufactured of any material. This means the device is not only suitable for the conveyance of ferromagnetic or magnetizable work pieces W or sheets but also for the conveyance of aluminum plates. Of course glass plates, plastic plates or even wooden plates can also be transported. Naturally surface conveyance is also possible and conceivable as described in the example in WO 97/38927 (FIG. 3, detail 30).

It is assumed that several of the shown devices are combined regularly and, if necessary, can be adjusted to varying plate sizes (e.g., as described in DE 299 15 611 U1, DE 43 42 753 A1 or U.S. Pat. No. 5,557,387).

One recognises that the applicable device in the examples is equipped with two parallel conveyor belts 1 which revolve while being driven by the gear teeth or pulleys 2 shown in FIG. 4. The conveyor belts 1 indicated in the version shown are toothed belts 1 which mesh with the teeth in the applicable recesses (not shown here) on pulley 2 to drive them. The two conveyor belts or toothed belts 1 are led past a retaining device 3.

The retaining device 3 is primarily designed as a hollow section strip and has several chambers 4, 5. The first chamber 4 is the compressed air chamber or passageway and the second chamber 5 is the negative pressure chamber or passageway. Compressed air is provided by the compressed air chamber or the compressed air passageway 4 which is converted to negative pressure with the negative pressure source 6 connected here (see also FIG. 3). The negative pressure source 6 shown in the example is an ejector which is pressurised on the pressure side with the applicable compressed air and generates on the suction side the desired negative pressure on one or more suction ports 7. The negative pressure source 6 is connected for this purpose to the related suction port 7 via a connection line 8. Naturally a conventional vacuum pump or a vacuum blower can also be used as negative pressure source 6.

The invention also always permits versions in which both the first chamber 4 and the second chamber 5 can be pressurised with negative pressure. Simultaneous overpressure in chambers 4, 5 is also conceivable.

The retaining device 3 can be anchored on the head side on a central anchor 9 on a frame, on a ceiling or similar fixed point. Anchor 9 is positioned in the middle between the two revolving conveyor belts 1. The suggested layout permits a change or an exchange of the applicable conventional conveyor belts 1 without having to remove any components of retaining device 3. It is assumed that individual suction ports 7 can be combined with the particular segments of the retaining device 3 into conveyance modules each of which can be controlled separately. This is necessary to be able to precisely drop off the conveyed work pieces W (cf. also EP 0 893 372 A1).

The retaining device 3 retains the work pieces W on the particular conveyor belts 1 by generating negative pressure on the described suction ports 7. As an alternative or in addition, the work pieces W can also be held on conveyor belt 1 by a magnetic field penetrating through the respective conveyor belt 1. Controllable magnetic devices 10 are provided for generation of the appropriate magnetic field which devices are equipped with at least one permanent magnet 11 and one related compensating coil 12.

The required negative pressure on the respective suction port 7 is produced—as already described—by negative pressure source 6 which is connected via connection line 8 to suction port 7 suctioning and/or blowing out. In principle it is also conceivable to connect connection line 8 to negative pressure chamber 5 on the one hand and to compressed air chamber 4 on the other hand to be able to represent the appropriate suctioning or repelling forces. This is usually accomplished with a pressure switch.

In connection with magnetizable or ferromagnetic work pieces W, the magnet device 10 generates closed magnetic field lines so that no interfering magnet fields are emitted to the outside. This is due to the alternating magnetic poles (N=North Pole and S=South Pole) in the core and the fact that identical poles (one North Pole N each in our examples) are generated at the edge of the magnetic device (10).

For longitudinal guidance of the portion of the resting conveyor belt 1, the retaining device 3 is equipped with a raised guidance device 13 on whose longitudinal edges 14 the conveyor belt supports on the device side rest on both sides. These conveyor belt supports can be the already mentioned teeth of the toothed belt or the conveyor belt 1.

The guidance device 13 is a rectangular guide ridge in cross section as FIG. 1 clearly illustrates. Of course, other cross section shapes such as a trapezoid, for example, are also conceivable. In our example the guidance device 13 is positioned in the middle in comparison to the related conveyor belt 1. Naturally, variations are conceivable in that two guidance devices 13 can also be implemented for each conveyor belt 1. The appropriate guidance devices or guidance ridges 13 are then usually positioned at the edge of conveyor belt 1. It is also recommended that each of the guidance devices 13 be magnetic and conductive so that one North Pole and one South Pole are created in the related guidance device 13.

The conveyor belt supports of conveyor belt 1 are equipped with resting surfaces 15 which correspond to the longitudinal edges 14 of guidance device 13. This ensures good axial guidance of the respective conveyor belt 1. This is particularly true when two (or even more) guidance devices 13 are used per conveyor belt 1.

The conveyor belt support in the cross section is mostly rectangular with a support width adapted to the width of the conveyor belt so that conveyor belt 1 has a rectangular cross section except for the recess (rectangular or trapezoidal) created between the longitudinal edges 14 of the device-sided conveyor belt supports 2.

The guidance device 13 or the rectangular shaped guidance ridge 13 fits into this recess which can be part of a ridge 16. This ridge 16 can be magnetic and conductive so that, when two guidance devices 13 are implemented per conveyor belt 1, the described poles (N, S) are created at the end.

Flexible steel leads 17 in the conveyor belt 1 ensure that, together with magnet device 10, the conveyor belt 1 rests correctly on the retaining device 3. In particular the flexible steel leads 10 ensure that the conveyor belt 1 does not sag.

The suction ports 7 between the parallel conveyor belts 1 are created from funnel-shaped suction jets 18 at the ends. The distance A of suction jets 18 or the suction ports 7 to the work pieces W can be adjusted. This is indicated in the figures with a double arrow. It is implemented by connecting the suction jets 18 with connection line 8 via a thread. The suction jets 18 or suction ports 7 can also be shifted, as desired, in the vertical direction so that distance A of the suction port 7 to the particular work piece W can be varied.

The examples also indicate a variation in which the connection line 8 ends in a (negative pressure) chamber or a negative pressure passageway U which, for example, is protected by a movable locking piece 19. The suction jets 18 or the suction ports 7 for this version are all positioned in the applicable locking piece 19 for negative pressure passageway U. The locking piece 19 can be shifted in the direction of the double arrow so that the desired variation of the distance A of the suction port 7 from the particular work piece W—as described before—is achieved.

The construction of the magnet device 10 will now be described. As already mentioned, the magnet device 10 in our example in FIG. 1 uses a permanent magnet 11 and a related compensating coil 12. An exterior U anchor 20 with an exterior U base 20a and exterior U legs 20b are implemented. Next to this exterior U anchor 20 is an interior U anchor 21 which also has an interior U base 21a and interior U legs 21b.

Located between the two U bases 20a and 21a is the permanent magnet 11 which is a ring magnet or also two or more bar magnets made of strontium ferrite or neodymium-iron-boron.

The compensating coil 12 is a conventional (oval or round) winding coil which is positioned horizontally and whose length is adjusted to the particular conveyor module. Both the interior U anchor 21 and the exterior U anchor 20 are designed as steel poles under consideration of the permanent magnet(s) 11 and form a magnetic return path as indicated by the magnetic poles (S=South Pole, N=North Pole) and described in detail in DE 197 24 634. See also DE 34 23 482 C1. Due to this, same and opposite magnetic poles are created on both U legs 21b of the interior U anchor 21 and also the two U legs 20b of the exterior U anchor 20.

The same applies to the version in FIG. 2. However, these involve one (or two) permanent magnets 11 surrounded by a vertical compensating coil 12. Magnetic conductive T-bars T (steel poles) on the sides not only ensure that the alternately different magnetic poles N or S are created on the work piece side as already described but also that closed magnetic field lines are created together with the magnetizable or ferromagnetic work pieces W. This is naturally also the case with the version in FIG. 1. This means that magnetic interference or control fields practically never occur.

In connection with FIG. 3, the device shown in FIGS. 1 and 2 is in some cases shown in longitudinal section. Consequently, one recognises only one of the two conventional conveyor belts 1. Due to the raised guidance device 13 or comparable measures, the work piece W has a distance A from a front face or opening plane 22 of the retaining device 3. The example specifies the distance A for the thickness of the conveyor belt 1.

Opening plane 22 is covered with suction ports 7 as well as additional ventilating and blow-out openings 23. The suction ports 7 and the ventilating and blow-out openings 23 are positioned alternately adjacent to each other in longitudinal extension of the retaining device 3 whereby each suction port 7 is assigned its own ventilating and blow-out opening 23. Of course, the invention also permits only every second suction port 7 to be assigned an ventilating and blow-out opening 23.

Due to the gap Z created on the front face of the work piece W as a consequence of the distance A between work piece W and opening plane 22, outside air is suctioned in through the ventilating and blow-out openings 23 as the arrows indicate in FIG. 3. Of course, outside air also penetrates there (and particularly there) where no work pieces W are being held by suction.

The ventilating and blow-out openings 23 can also be pressurised with overpressure or compressed air.

In the second version shown in FIGS. 4 to 6, the conveyor belt 1 is a toothed belt revolving around retaining device 3. Pulleys or gear teeth installed on retaining device 3 are designated as 2.

As shown most clearly in FIGS. 4 and 5, there is a negative pressure passageway U between the two switchable magnetic devices 10. In our example there are two conveyor belts 1 running around retaining device 2. Conveyor belts 1 are guided in grooves 24.

The negative pressure passageway U is equipped with ventilating lines 25. Airing openings 26 on one end of the ventilating lines 25 are located in a wall 27 pointing towards the work pieces (not shown here). The other end of the ventilating lines 25 is only open towards the environment.

One exterior side of the wall 27 pointing towards the work pieces (not shown here) which forms opening plane 22 of the ventilating openings 26 is recessed by a distance A opposite a conveyor plane F defined by the exterior side of conveyor belts 1 pointing towards the work pieces (W) (not shown here). The gap Z is limited by the conveyor plane F and the two conveyor belts 1 as well as the exterior side of the wall 27.

As particularly clearly shown in FIG. 6, wall 27 of the negative pressure passageway U also contains the suction ports 7. The suction ports 7 are formed in the suction covers 28 connected with the wall 27. The suction covers 28 can be screwed into the wall 27, for instance. The suction covers 28 are formed conically (like a valve seat) on its back pointing towards the negative pressure passageway U.

29 designates the compressed air connection pieces which protrude into the negative pressure passageway U and which contain the axial movable jet pistons 30. Reset springs 31 force the jet pistons 30 into an opening position (i.e., a position in which the suction ports 7 are connected with the negative pressure passageway U). The compressed air connection pieces 29 are connected at the other end with a compressed air passageway 33 via compressed feeders 32. Valves 34 are activated in the compressed air feeders which can be controlled electrically. The valves 34 can be addressed in groups.

As particularly shown in FIG. 4, the ventilating openings 26 and the suction ports 7 are positioned consecutively at equal distances along a conveyor device.

The version show in FIG. 7 is similar to the version shown in FIG. 6. The conveyor belts 1 are guided here by two grooves 24. The end of the compressed air connection piece 29 extends until almost the interior side of the suction cover 28. During pressurisation of the compressed air connection piece 29 with compressed air, this is blown out through suction opening 7. The suction opening 7 is dynamically closed in this case even when the negative pressure passageway U continues to be pressurised with negative pressure.

FIG. 8 shows a view of a bottom of a third device. The two conveyor belts 1 are each guided here by two grooves 24. The opening plane 22 between the two conveyor belts 1 is shown in which the suction covers 28 are screwed to the suction ports 7. The openings of the compressed air connection pieces 29 are also indicated. The ventilating openings 26 are formed here as two slits at the edges of the opening planes 22. The slits are located opposite each other. They are positioned approximately in the middle between two suction ports 7.

FIG. 9 shows a cross section view with intersecting lines C-C' in FIG. 8. The suction port 7 is funnel-shaped here. The compressed air connection piece 29 protrudes into the area of suction port 7. The air is suctioned from the gap Z through a ring gap created between the compressed air connection piece 29 and a breakthrough located on suction shutter 28. In contrast to the aforementioned examples, the negative pressure passageway U is located here in a ventilating passageway 35. The ventilating passageway 35 can be equipped with a device (not shown here) for control of the air masses passing through the ventilating passageway 35. This can be an air shutter, for instance. The suggested construction is very compact.

FIG. 10 shows a cross section view with intersecting lines D-D' in FIG. 8. This view clearly shows the connection between the ventilating passageway 35 and the slit-shaped ventilating openings 26.

FIG. 11 shows a longitudinal section with intersecting lines E-E' in FIG. 8. This figure shows in particular the group control of the compressed air connection pieces 29. Their compressed air feeders 32 are connected in groups to valves 34. When the valves 34 open, they can be pressurised in groups with compressed air for precise ejection of the work pieces W.

The function of the devices is described below.

To convey work pieces W which are made of a ferromagnetic material and are plate-shaped in particular, a magnetic field is generated via the magnet devices 10 which penetrates the conveyor belts 1. The work pieces adhere to the conveyor belts 1. To drop off the work pieces W, the magnetic field is switched off in a specified ejection zone.

To convey work pieces W which are made of a non-ferromagnetic material and are plate-shaped in particular (e.g., aluminum plates), the negative pressure passageway U is pressurised with negative pressure by a negative pressure source (not shown here). A negative pressure current is created from gap Z through the suction ports 7 to the negative pressure passageway U. Due to the negative pressure created in gap Z, air is also sucked into the gap Z through the ventilating openings 26. A dynamic negative pressure is generated through which the work pieces W are retained on the conveyor belts 1.

To drop off the work pieces W from the conveyor belt 1, the valves 34 are opened, preferably in groups. The compressed air connection pieces 29 which lead to the jet pistons 30 are pressurised with overpressure. Any existing jet pistons 30 are then forced against the reset effect of the reset springs against the interior side of the suction covers 28 so that the connection of the suction ports 7 to the negative pressure passageway U is interrupted. At the same time, compressed air is blown through the jet pistons 30 into gap Z. The dynamic negative pressure in gap Z suddenly breaks down. The work pieces adhering to conveyor belts 1 are precisely drop off.

When operating the described devices it is advantageous to have the negative pressure passageway U constantly pressurised with a constant negative pressure. The precise dropping off of the work pieces W can be achieved quickly and easily in this case by pressurising the compressed air connection pieces 29 with compressed air in a specified zone. The suggested procedure is much faster than just interruption or switching off the negative pressure current in the specified area.

Using the suggested device, it is possible to convey both ferromagnetic and non-ferromagnetic work pieces and eject them precisely. The construction of the device is particularly simple and compact.

Reference Designation List

1 Conveyor belt
2 Pulley
3 Retaining device
4 First chamber
5 Second chamber
6 Negative pressure source
7 Suction port
8 Connection line
9 Anchor
10 Magnet device
11 Permanent magnet
12 Compensating coil
13 Guidance device
14 Longitudinal edge
15 Resting surface
16 Ridge
17 Flexible steel lead
18 Suction jet
19 Locking piece
20 Exterior U anchor
20a Exterior U base
20b Exterior U leg
21 Interior U anchor
21a Interior U base
21b Interior U leg
22 Opening plane
23 Ventilating and blow out opening
24 Groove
25 Ventilating line
26 Ventilating opening
27 Wall
28 Suction shutter
29 Compressed air connection piece
30 Jet piston
31 Reset spring
32 Compressed air feeder
33 Compressed air passageway
34 Valve
35 Ventilating passageway
W Work piece
U Negative pressure passageway
T T-bar
A Distance
Z Gap
F Conveyor plane

What is claimed is:

1. A device to convey suspended, plate-shaped work pieces or metal sheets, said device comprising:
   at least one conveyor belt (1) revolving around a retaining device (3) for conveyance of work pieces (W) adhering thereto;
   a controllable or regulatable device (6) for generation of negative pressure, said controllable or regulatable device (6) serving to retain the work pieces on the conveyor belt (1) and having
   an opening plane (22) defined by suction ports (7) that is recessed from the retaining device (3) at a distance (A) in relation to a conveyor plane (F) created by an exterior side of the conveyor belt (1) so that a gap (Z) is produced between a work piece (W) adhering to the conveyor belt (1) and the opening plane (22) and the work piece (W) is held on the conveyor belt (1) by a negative pressure that is created in the gap (Z),
   wherein a device (8, 23, 25, 26, 29, 30, 32) for ventilating the gap (Z) is provided so that the work piece is retained on the conveyor belt (1) by dynamic negative pressure.

2. The device as defined in claim 1, wherein the suction ports (7) are provided on a wall (27) that faces toward the work pieces, said wall defining a portion of a negative pressure passageway (U) that runs essentially parallel to a conveying direction of the work pieces (W).

3. The device as defined in claim 2, wherein the suction ports (7) are produced by suction jets (28) in the wall (27).

4. The device as defined in claim 1, wherein the device for ventilating (8, 23, 25, 26, 29, 30, 32), on the side of the retaining device (3) facing toward the work pieces (W), has regularly spaced ventilating openings (23, 26) so that an essentially constant dynamic negative pressure is created over an entire length of the gap (Z).

5. The device as defined in claim 4, wherein the ventilating openings (23, 26) are arranged on the wall (27) of the negative pressure passageway (U) that faces toward the work pieces (W).

6. The device as defined in claim 4, wherein each ventilating opening (23, 26) forms an end of a ventilating line (25) passing through the negative pressure passageway (U).

7. The device as defined in claim 4, wherein the ventilating lines (23, 26) are connected with a ventilating passageway (35).

8. The device as defined in claim 4, wherein the suction ports (7) and ventilating openings (23, 26) are positioned alternately one after the other in longitudinal extension of the retaining device (3).

9. The device as defined in claim 1, wherein a device is provided for control and/or regulation of the dynamic negative pressure.

10. The device as defined in claim 1, wherein a device is provided for generation, as desired, of a burst of compressed air to interrupt the dynamic negative pressure.

11. The device as defined in claim 10, wherein the device for generation of the burst of compressed air is compressed air jets (29, 30) arranged coaxially on the suction ports (11).

12. The device as defined in claim 11, wherein the compressed air jets (29, 30) can be moved back and forth axial to the suction ports (7).

13. The device as defined in claim 11, wherein the suction ports (7) can be closed via the compressed air jets (29, 30).

14. The device as defined in claim 10, wherein the compressed air jets (29, 30) are positioned in the negative pressure passageway (U).

15. The device as defined in claim 10, wherein the burst of compressed air is directed from the negative pressure passageway (U) through the suction ports (7) to the gap (Z).

16. The device as defined in claim 11, wherein the compressed air jets (29, 30) can be pressurised with compressed air when the work piece is dropped off.

17. The device as defined in claim 1, wherein a ventilating airing opening (26) and a compressed air jet (30) are assigned to each suction port (7).

18. The device as defined in claim 1, wherein the retaining device (3) contains electrical, switchable magnets (10) so that magnetic work pieces (W) can be magnetically retained on the conveyor belt (1).

19. The device as defined in claim 18, wherein the negative pressure passageway (U) is located between two magnets (10).

20. A method for the conveyance of suspended, plate-shaped work pieces or metal sheets, wherein at least one conveyor belt (1) for conveyance of the work pieces (W) adhering thereto revolves around a retaining device (3), providing a controllable or regulatable device (6) for generating negative pressure for retaining the work pieces (W) on the conveyor belt (1), creating an opening plane (22), which is defined by suction ports (7) and recessed from the retaining device (3) by a distance (A) in relation to a conveyance plane (F), said opening plane being created by the exterior side of the conveyor belt (1) so that a gap (Z) is provided between a work piece (W) adhering to the conveyor belt (1) and the opening plane (22) and, retaining the work piece (W) on the conveyor belt (1) by a negative pressure (U) created in the gap (Z), and, providing a device (8, 23, 25, 26, 29, 30, 32) for ventilating the gap (Z) so that the work piece (W) is retained on the conveyor belt (1) by a dynamic negative pressured created in the gap (Z).

21. The method as defined in claim 20, wherein the device for ventilating along the retaining device (3) is equipped with ventilating openings (23, 26) at regular intervals so that a primarily constant dynamic negative pressure is generated over the entire length of the gap (Z).

22. The method as defined by in claim 20, comprising the further step of interrupting the dynamic negative pressure by a burst of compressed air directed into the gap (Z) and thereby releasing said work pieces (W).

23. The method as defined in claim 22, comprising the further step of directing the burst of compressed air from a negative pressure passageway (U) through the suction ports (7) to the gap (Z).

24. The method as defined in claim 20, comprising the further step of controlling or regulating the dynamic negative pressure via the device (8, 23, 25, 26, 29, 30, 32) for ventilating the gap (Z).

25. The method as defined in claim 20, comprising the further step of axially moving the compressed air jets (29, 30) for creating the burst of compressed air in the direction of the suction ports (7) when pressurised with compressed air.

26. The method as defined in claim 25, comprising the further step of closing the suction ports (7) via the compressed air jets (29, 30) when the compressed air jets (29, 30) are pressurised with compressed air.

27. The method as defined in claim 25, comprising the further step of generating the burst of compressed air in a specified group of consecutive suction ports (7).

* * * * *